United States Patent [19]
Hills et al.

[11] 3,828,258
[45] Aug. 6, 1974

[54] SIGNAL DURATION SENSING CIRCUIT

[75] Inventors: Vernon Elton Hills, Hightstown; Leesui Wu, Cherry Hill, both of N.J.

[73] Assignee: RCA Corporation, New York, N.Y.

[22] Filed: Mar. 23, 1973

[21] Appl. No.: 344,298

[52] U.S. Cl............. 328/111, 307/221 R, 307/234, 328/37
[51] Int. Cl. .......................................... H03k 5/20
[58] Field of Search............... 307/221 R, 234, 265; 328/37, 58, 111, 112

[56] References Cited
UNITED STATES PATENTS
| | | | |
|---|---|---|---|
| 3,185,864 | 5/1965 | Amodei et al................... | 307/221 B |
| 3,667,054 | 5/1972 | Nelson.............................. | 307/234 |
| 3,676,699 | 7/1972 | Warren............................. | 307/234 |
| 3,727,142 | 4/1973 | De Sipio et al.................. | 328/111 |

OTHER PUBLICATIONS
"Pulse Discriminating Latch" Bolt et al., IBM Tech. Disclosure Bulletin, Vol. 9, No. 8, January, 1967, page 985.
"Electrical Filter" Burke et al., IBM Tech. Disclosure Bulletin, Vol. 12, No. 9, February, 1970, pp. 1,369–1,370.

*Primary Examiner*—Stanley D. Miller, Jr.
*Attorney, Agent, or Firm*—H. Christoffersen; Henry I. Schanzer

[57] ABSTRACT

A circuit for producing output levels having a first or a second binary significance in response to input signals having a first or a second value, respectively, for a period greater than T. The circuit includes means for sampling and storing the input signal in response to a sampling pulse followed in a time T by a shift pulse. The circuit also includes means feeding back the output of the circuit to its input for preventing any input signal whose duration is less than T from altering the state of the output. The circuit also includes means for overriding the sampling, shifting and feedback controls for passing all input signals to the output of the circuit with very little delay.

10 Claims, 3 Drawing Figures

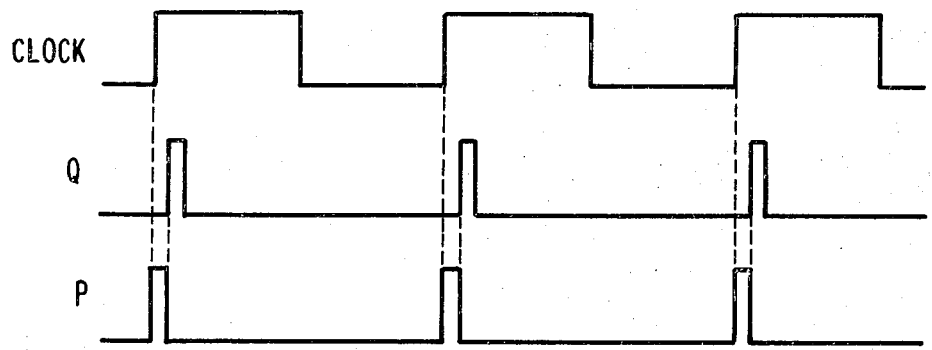
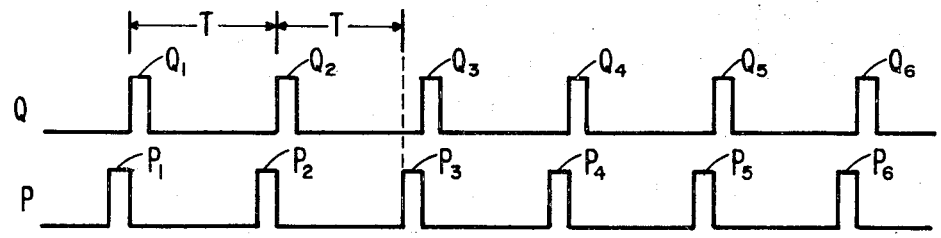
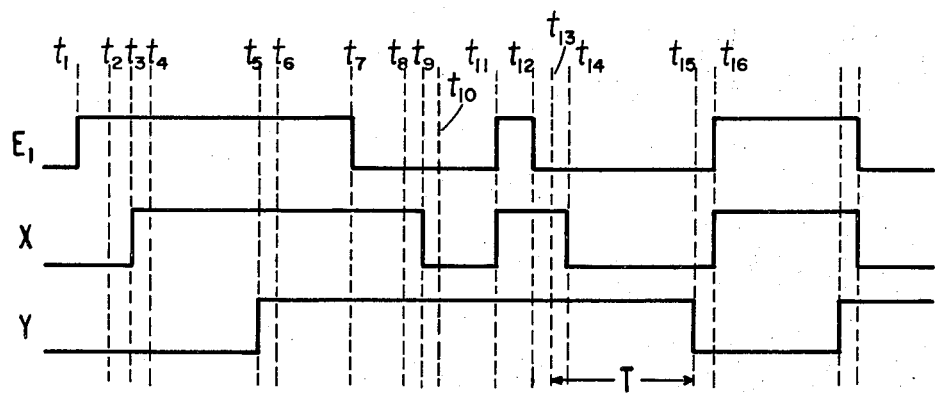
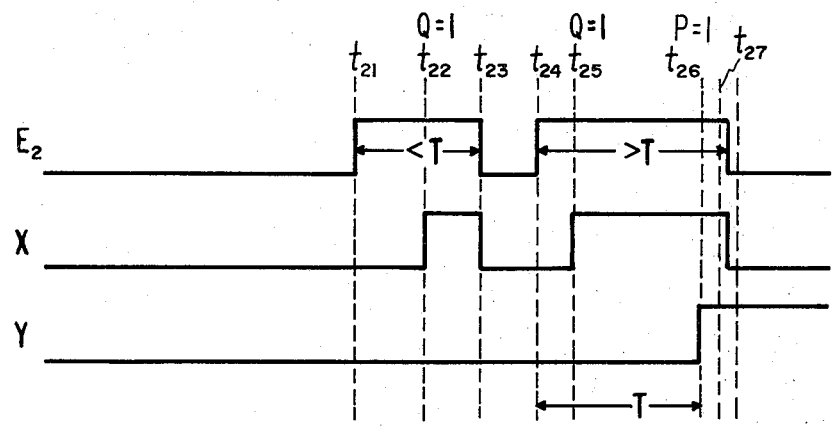
Fig. 2
Fig. 3

SIGNAL DURATION SENSING CIRCUIT

This invention relates to digital means for sensing the duration of input signals.

Input signals often contain erroneous, undesirable or unusable information which must be filtered. For example, signals generated immediately following the closure of mechanical switches or signals generated in a very noisy electrical environment often have a rapidly and erratically changing characteristic such that the actual value or state of the signals is indeterminate. In most systems it is desirable and/or necessary that these transient signals be filtered. There are other applications and circumstances in which erroneous signals are produced. A very topical example is found in systems for detecting whether an occupant is seated in a car seat. A person seated in a car seat will often bounce up from the seat in the course of travelling over a bumpy road. For the duration of time the person is out of the seat a signal is produced indicating that the seat is not occupied. This input signal is false and must be filtered before being fed to an alarm or other control device. Obviously, there are inumerable applications where the duration of an input signal should be greater than some given minimum value before it is treated as a valid signal.

In circuits embodying the invention the input signal is repetitively sampled by digital techniques to determine its duration. If the signal duration is shorter than the sampling pulse spacing, T, the signal is treated as noise and is filtered. If the duration $T_s$ of the signal is greater than T the signal is allowed to pass through the filter. It is a feature of the invention that the value of the input signal during one sampling time is effectively compared with the value of the input signal during a succeeding sampling time for determining whether the input signal duration is less than or greater than T.

Circuits embodying the invention include a first stage adapted to receive input signals and which in response to a sampling signal produces and stores at its output a signal indicative of the input signal level. A second stage is coupled at its input to the output of the first stage and in response to a shift pulse, which occurs a time T after said sampling pulse, the second stage produces and stores at its output a signal corresponding to that at the output of the first stage. The output of the second stage is coupled to the first stage for preventing signals whose duration is less than T from altering the signal stored at the output of the first stage.

In the accompanying drawings,

FIG. 2 is a diagram illustrating the waveforms of the "clock" pulse and the sampling and shifting pulses associated with FIG. 1; and FIG. 3 is a diagram illustrating waveforms of typical input signals which may be applied to the input of FIG. 1 and corresponding circuit waveforms.

DETAILED DESCRIPTION

Figure 1:
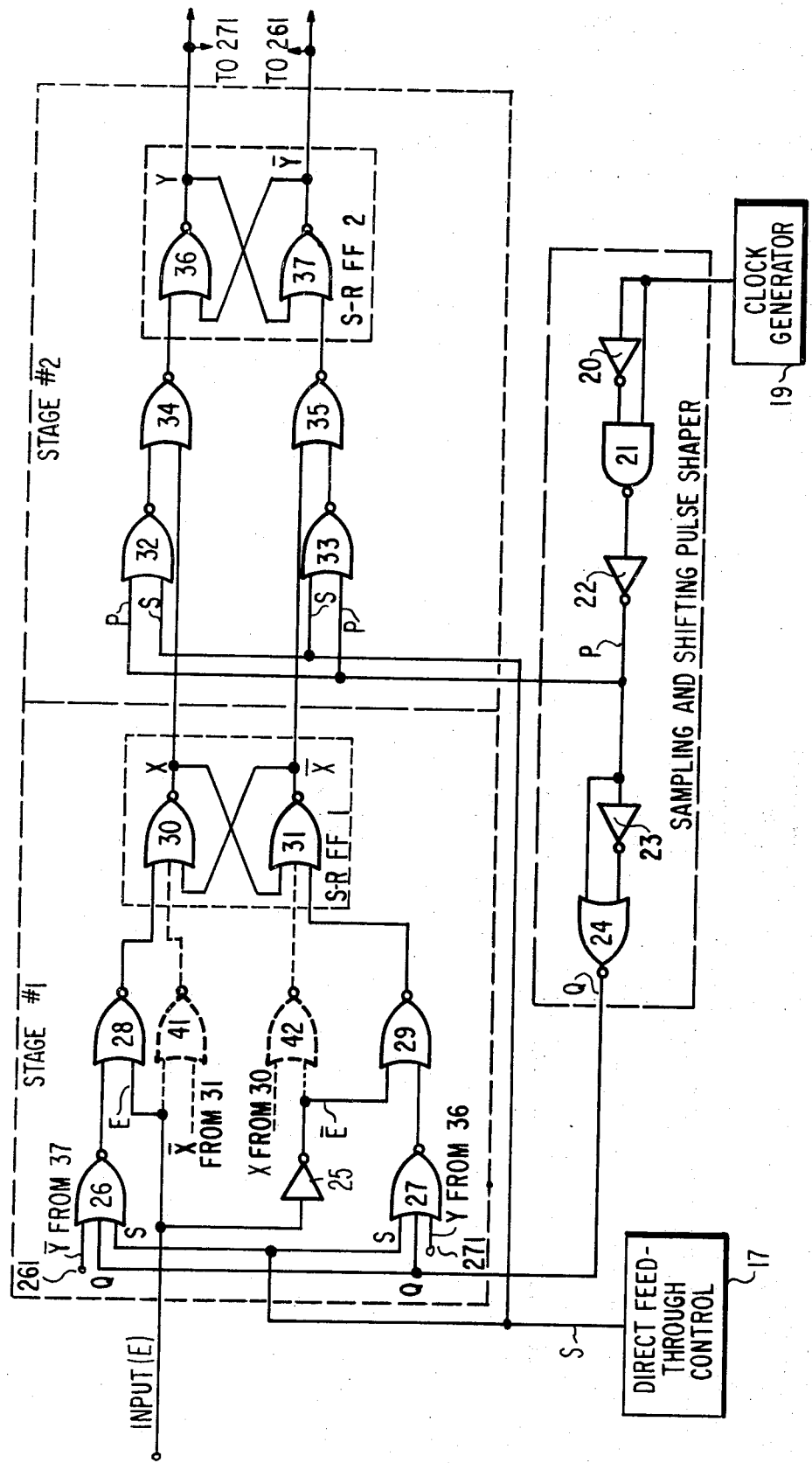
FIG. 1 is a schematic diagram of a circuit embodying the invention.

The circuitry shown in FIG. 1 makes use of various combinations of NOR and NAND gates to perform logic and storing furnctions. These gates are shown by way of example only and any logic gates which can perform the same or equivalent logic functions may be used instead.

In the discussion to follow it will be convenient to discuss operation in Boolean terms. The convention arbitrarily adopted is that the most positive voltage used in the system represents the binary digit 1 also called "high" or "hi" and the least positive voltage represents the binary digit 0 also referred to as "low" or "lo." To further simplify the explanation of the circuit operation it will sometimes be stated that a 1 (high or hi) or a 0 (low or lo) is applied to a circuit or obtained from a circuit rather than stating that a voltage which is indicative of a 1 or 0 is applied or derived from a circuit.

The circuit of FIG. 1 includes a first stage (stage 1) for sampling and storing input signals (E) and a second stage (stage 2) for storing the output (X, X̄) of the first stage. Each stage includes gating means controlling the passage and storage of information in a flip-flop (FF No. 1, FF No. 2). The gating means (gates 25, 26, 27, 28 and 29) of the first stage is controlled by feedback (Y & Ȳ) derived from the output of the second stage, a sampling pulse labelled Q, and a filter bypass signal labelled S. The gating means of the second stage (gates 32, 33, 34 and 35) is controlled by a shift pulse labelled P and by the signal S. The circuit also includes a clock generator 19 and circuitry for producing the sampling pulse Q and the shift pulse P.

The clock generator 19 may be any one of a number of well known clock generating means capable of producing periodically repetitive signals. For purposes of illustration, assume the output of the clock generator to be the waveform labelled "clock" in FIG. 2. The output of the clock generator is applied to one input of inverter 20 and to one input of two input NAND gate 21. The output of inverter 20 is applied to the second input of NAND gate 21.

Inverter 20 and NAND gate 21 form a positive edge detector. When the clock goes positive, the two inputs of NAND gate 21 are positive for a short time interval. That is, the input of NAND gate 21 directly connected to the clock generator goes positive immediately (when the clock goes positive) while the other input to the gate 21 remains positive until inverter 20 discharges its output to the low voltage level. For the time duration when its two inputs are high NAND gate 21 produces at its output a negative going pulse which is then inverted by inverter 22 to produce the shifting pulse "P" so labelled in FIG. 2. Th "P" pulse is applied to one input of two input NOR gates 32 and 33 to inverter 23, and to one input of two input NOR gate 24. The output of inverter 23 is connected to the other input of gate 24.

Inverter 23 and NOR gate 24 form a negative edge detector. When the P pulse goes negative, the two inputs of NOR gate 24 are negative for a short time interval. The input of NOR gate 24 directly connected to the P pulse goes negative immediately (when the P pulse goes negative) while the other input of gate 24 does not go positive until inverter 23 charges its output to a sufficiently high level. Thus, following each negative edge of the "P" pulse there is produced a narrow positive sampling pulse denoted by the letter Q as shown in FIG. 2.

The sampling pulse Q is applied to one of the inputs of three input NOR gates 26 and 27. Another input to each one of NOR gates 26 and 27 is the signal labelled "S" produced by DIRECT FEED-THROUGH CONTROL element 17. The third input to gate 26 is the Y output from gate 37 and the third input to gate 27 is the Y output from gate 36. The output of gate 26 and the input signal (E) are applied to the two inputs of NOR gate 28. The output of gate 28 is applied to one input reset of two input NOR gate 30. The output of gate 27 and the complement of the input signal ($\bar{E}$) derived from the output of inverter 25 are applied to the two inputs of NOR gate 29. The output of gate 29 is applied to one input set of NOR gate 31.

NOR gates 30 and 31 are cross coupled to form a Set-Reset Flip-Flop (FF No. 1). That is, the output, X, of gate 30 is fed back to one input of gate 31 and the output $\bar{X}$ of gate 31 is fed back to one input of gate 30.

The two inputs to NOR gates 32 and 33 are the P and S signals. The two inputs to NOR gate 34 are the output of gate 32 and X from gate 30 and the two inputs to NOR gate 35 are the output of gate 33 and $\bar{X}$ from gate 31. The output of gate 34 is applied to one input reset of NOR gate 36 and the output of gate 34 is applied to one input set of NOR gate 37. Gates 36 and 37 are cross coupled to form a Set-Reset Flip-Flop (FF No. 2). The output Y of gate 36 is fed back to one input of gate 37 and the output $\bar{Y}$ of gate 37 is fed back to one input of gate 36.

Gates 41 and 42 are drawn with dashed lines to indicate that their use is optional.

If gate 41 is used, the input signal and $\bar{X}$ are applied to its two inputs and its output is connected to one input of NOR gate 30. If gate 42 is used, $\bar{E}$ and X are applied to its two inputs and its output is applied to one input of NOR gate 31. In the event that the input (E) is low and that FF No. 1 is set by extraneous noise such that X is high and $\bar{X}$ low, the output of gate 41 goes high forcing X back to low. This ensures that any faulty condition will be eliminated. This provides better filtering to the system in a very noisy environment.

In the event that the input (E) is high and that FF No. 1 is set by extraneous noise such that X is low and $\bar{X}$ high, the output of gate 42 goes high forcing X back to high. As above this ensures that any faulty condition is eliminated. In the discussion to follow it will be assumed that gates 41 and 42 are not in the circuit.

The circuit may be operated in the sampling mode when S is lo or in the direct-feed-through mode when S is high. The sampling mode being the primary mode of operation will be discussed first.

SAMPLING MODE

In the sampling mode the S pulse produced by Direct Feed-Through control, 17, is kept low. When the "Q" pulse goes high the input signal is sampled and information indicative of the level (Hi or Lo) of the input signal is transferred to and sets flip-flop No. 1. When Q is High the outputs of gate 26 and 27 are Lo. During this time interval Y and $\bar{Y}$ have no effect on the gating circuit and it is immaterial which one of Y and $\bar{Y}$ is Hi and which one is Lo. It will now be shown that when Q is Hi that a High input signal (E) will cause X to go Hi, ($\bar{X}$ - Lo) and a Lo input signal will cause X to go Lo ($\bar{X}$ - Hi).

Whenever Q is Hi, the outputs of gates 26 and 27 are low and, therefore, gates 28 and 29 each have one low input. E - Hi applied to the other input of gate 28 causes the output of gate 28 to go lo. Concurrently, E - Hi is inverted by gate 25 to produce a low input to NOR gate 29. NOR gate 29 having two lows applied to its two inputs produces a high output which is applied to NOR gate 31 which causes $\bar{X}$ to go low. Since the two inputs to NOR gate 30 are low X goes high. Therefore, during a sampling interval (when Q is high), a high input signal causes flip-flop No. 1 to be set to X high and $\bar{X}$ low.

When Q is high and E is low, two low inputs are applied to gate 28 causing its output to go high. Concurrently, E - Lo is inverted by inverter 25 to produce a high at one of the two inputs of gate 29. The output of gate 29, therefore, goes low. The high output of gate 28 applied to the reset input of gate 30 causes X to go low. As a result, the two inputs to NOR gate 31 are then low causing $\bar{X}$ to go high. Therefore, during a sampling interval (when Q is high), a low input signal causes X to be set low and $\bar{X}$ to be set high.

It should be appreciated that the use of two paths (one path comprising gates 26, 28 and the other path comprising ages 27, 29) to set and reset flip-flop No. 1 and the use of inverter 25 to generate $\bar{E}$ provides a steering control such that one of the two inputs of the flip-flop is always positively set. That is, a high input will be applied to gate 31 causing $\bar{X}$ to go lo and X to go hi when E is hi and a high input will be applied to the input of gate 30 causing X to go lo and $\bar{X}$ to go hi when E is lo. Thus, by means of the steering inverter 25 the set-reset flip-flop comprised of NOR gates 30 and 31 is always positively set.

The response of flip-flop No. 1 to the input signal E for Q - Hi is summarized in Table 1 below.

Signals X and $\bar{X}$ present at the output of flip-flop No. 1 are transferred and stored in set-reset flip-flop No. 2 upon the application of a shifting pulse P to NOR gates 32 and 33. The pulse P, as shown in FIG. 2, occurs, approximately, at a time T after the occurrence of the Q pulse. The positive going P pulse is applied to one of the two inputs of NOR gates 32 and 33. When the circuit is in its sampling mode and the S pulse is low, P going high causes the outputs of NOR gates 32 and 33 to go low. Therefore, when P is high one of the two inputs to NOR gate 34 is low while its other input is the X signal. Concurrently, one of the two inputs to NOR gate 34 is low while its other input is the signal $\bar{X}$. When X is low the output of NOR gate 34 is high and the output of NOR gate 34 is low. This sets the output, Y, of flip-flop No. 2 to the low level and the output $\bar{Y}$, to the high level. For the condition when X is high and $\bar{X}$ low, the output of NOR gate 34 is high and the output of NOR gate 35 is low. This sets the Y output high and the $\bar{Y}$ output low. For X low and $\bar{X}$ high, Y goes low and $\bar{Y}$ high. The Y output is fed back to input 271 of gate 27 and the $\bar{Y}$ output is fed back to input 261 of gate 26. The feed-back of Y and $\bar{Y}$ prevents any input signal whose duration is less than T from being permanently stored in flip-flop No. 1 and from passing through the filter.

So far, it has been shown that when Q is high that the input signal level sets flip-flop No. 1 to a corresponding level and that when P is high that flip-flop No. 2 is set to correspond to the state of flip-flop No. 1.

To fully understand the circuit operation it is necessary to examine the circuit for the condition when Q is low and E is either high or low and for the condition when E changes level while Q is low. In the sampling mode when Q is low (and S is low) the output of the first stage (X and $\bar{X}$) should be unaffected by changes in the input signal. That this is so may be shown as follows.

Assume Q is low and S is low and that Y is high and $\overline{Y}$ is low. For these conditions, E - hi keeps or causes X to be high and $\overline{X}$ to be low while E - lo has no effect on the state of the flip-flop. For Y high the output of gate 27 is low. Concurrently, for $\overline{Y} = Q = S = $ lo, the output of gate 26 is high and correspondingly the output of gate 28 is low. If E is high the two inputs to NOR gate 29 are low causing the output of NOR gate 29 to go high. The high output of NOR gate 29 causes $\overline{X}$ to be low and since the two inputs to NOR gate 28 are low X is high. It should be emphasized at this point that the condition Y high and $\overline{Y}$ low exists because X was high and $\overline{X}$ was low when the preceeding P pulse went positive. In turn, X was high and $\overline{X}$ was low because the input signal had been high for a period of time gerater than T prior to the preceeding P pulse. Therefore, when Q is low, Y high and $\overline{Y}$ low enable a high input signal to be coupled through the gating circuit of the first stage to maintain flip-flop No. 1 in the state in which it already is, or to reset flip-flop No. 1 to the state in which it was in if E went low when Q was high and E is low for a period of time shorter than T.

For Q low, S low, Y high and $\overline{Y}$ low it will now be shown that when the input signal goes low there is no change in the output of the first stage. Recall from above that for Y - hi and $\overline{Y}$ - lo that the output of gate 26 is high and the output of gate 27 is low. Accordingly, the output of gate 28 is low. When E is low the output of NOR gate 28 remains low and the reset input to flip-flop No. 1 is low. Concurrently, $\overline{E}$ - hi is applied to NOR gate 29. As a result of the output of NOR gate 29 will also be low. Therefore, for the condition of E - lo two low signals are applied to the set and reset inputs of flip-flop No. 1. When low inputs are applied to both the set and reset inputs of the flip-flop it remains in its previous state. That is, it does not change state. Therefore, for the condition Q = S = 0 and for Y high and $\overline{Y}$ low, the output (X and $\overline{X}$) of the first stage remains in whatever state to which it was previously set when Q was high. The above responses are summarized in Section 2 of Table 1.

For the condition when Q = S = P and Y is low and $\overline{Y}$ is high, it may be shown that for E - hi the set and reset inputs to flip-flop No. 1 are both low such that X and $\overline{X}$ remain at whatever level they were set prior to E going high. If, on the other hand E is low or goes low, X will be kept at or reset to the low level and $\overline{X}$ will be kept at or reset to the high level. The condition Y low ($\overline{Y}$ high) resulted from E being low for at least a time T and from X being low for the same time T. Where T includes a pulse followed by a shift pulse. Therefore, for the conditions of Q = Y = 0 and $\overline{Y}$ = 1, E-lo keeps X in the condition in which it was already set. If E went hi when Q went hi, X would go hi and $\overline{X}$ low. However, this condition would be maintained only so long as E remained hi. If E went lo prior to the next P pulse (that is, the duration of the positive going E pulse is less than T) the output of flip-flop No. 1 is reset to X - lo and $\overline{X}$ high due to the feedback of Y low and $\overline{Y}$ high. Therefore, the feedback of the Y and $\overline{Y}$ output from gates 36 and 37 to the inputs of gates 26 and 27 ensures that for Q low the information stored in the filter is not changed or altered for pulses of duration shorter than T. The response of the circuit for Q = Y = 0 and $\overline{Y}$ = 1 are summarized in section 3 of Table 1.

TABLE 1

| | E Input Signal | X | $\overline{X}$ |
|---|---|---|---|
| 1. Q Hi S=0 | Y Hi, $\overline{Y}$ Lo    Hi or Y Lo, $\overline{Y}$ Hi    Lo | Hi Lo | Lo Hi |
| 2. Q Lo S=0 | Y Hi, $\overline{Y}$ Lo    Hi Lo | Hi Unchanged remains in state set when Q was Hi | Lo |
| | If E changes from lo to hi before P pulse | Hi | Lo |
| 3. Q Lo S=0 | Y Lo, $\overline{Y}$ Hi    Lo Hi | Lo Unchanged remains in state set when Q was Hi | Hi |
| | If E changes from Hi to Lo before P pulse | Lo | Hi |

The foregoing description of the operation of the circuit may best be understood with reference to some typical input waveforms illustrated in FIG. 3.

An input signal $E_1$ is assumed to go high at time $t_1$. At time $t_2$, a pulse $P_1$ is applied but this has no effect on the X or Y outputs. A time $t_3$, $Q_1$ goes high and now regardless of its prior state, X goes positive. At time $t_4$, $Q_1$ goes low. However, as long as $E_1$ remains high, X remains high. At time $t_5$, $P_2$ goes high and the output of flip-flop 1 is transferred to flip-flop 2 and both X and Y go high. At time $t_6$, $Q_2$ goes high and since E, is still high, X is maintained high.

At time $t_7$, $E_1$ goes low. The circuit conditions at that time are Q = S = $\overline{Y}$ = 0, and Y = 1. For these conditions, as discussed above X and $\overline{X}$ remain in the state to which they were set when the preceeding $Q_2$ pulse was high. Thus X and $\overline{X}$ remain high and low, respectively. At time $t_8$, $P_3$ high but neither X nor Y is changed thereby. However, at time $t_9$, $Q_3$ goes high. When $Q_3$ is high, $E_1$ is sampled and its level is stored in flip-flop 1. At time $t_{10}$, $Q_3$ goes low and since $E_1$ remains low unitl time $t_{11}$, the signal stored at the output of flip-flop 1 remains at X low and $\overline{X}$ high.

At time $t_{11}$, $E_1$ returns to the high level. At this point, the circuit conditions of Q = Y = 0 and $\overline{Y}$ = 1 exist and for these conditions flip-flop 1 is reset so that X goes high and $\overline{X}$ goes low. This illustrates that when Q is low, the output (Y and $\overline{Y}$) of the second stage controls the passage of the input signal through the gating circuitry of the first stage. Furthermore, the output (Y, $\overline{Y}$) is compared to the input signal. Since the output corresponds to the input which existed one period earlier it may be stated as a general proposition that the input at any one time is being compared to the input that existed a period T earlier. Where the level of the input signal differs from the level present at the output, the input signal must maintain its level for a period equal to or greater than T where T includes a sampling pulse Q and a succeeding shift pulse P to cause the output of flip-flop 2 to change state. Since at time $t_{11}$ $E_1$ was lo for a duration shorter than T following a condition of $E_1$ hi, and since the condition of Y = 1 and $\overline{Y}$ = 0 exist, flip-flop 1 is reset and X goes hi and $\overline{X}$ lo.

At time $t_{12}$ $E_1$ goes low again $t_1$ again and, as before the time $t_7$ to $t_9$, flip-flop 1 is not by b the change in $E_1$. Y hi and $\overline{Y}$ lo act to filter out this information. At time $t_{14}$, $Q_4$ goes high and now X and $\overline{X}$ are set to Lo and Hi, respectively while Y and $\overline{Y}$ remain unchanged. Now, E remains lo until time $t_{15}$ when P goes hi. The information stored in flip-flop 1 is transferred and stored in flip-flop 2 and Y and $\overline{Y}$ go low and high, respectively. If at time $t_{16}$ corresponding to Q going high, $E_1$ goes high again, X and $\overline{X}$ go high and low, respectively. But, Y and $\overline{Y}$ remain lo and hi, respectively remaining at that level for a period T. In this example, it has been shown that if the output of the second stage is in the high level, that the input signal must go negative for a period of time equal to or greater than T where T includes a sampling pulse followed by a shifting pulse.

A second input waveform $E_2$ is shown which is assumed to be low unitl time $t_{21}$. $E_2$ going high has no effect on X or Y which remain low. It is only at $t_{22}$ when $Q_3$ goes high that X goes high. Y still remains low. At $t_{23}$, E2 returns to the low level. The circuit conditions at that point are $Q = Y = 0$ and $\overline{Y} = 1$. For these conditions as discussed above, flip-flop 1 is reset to X low and $\overline{X}$ high. At time $t_{24}$, $E_2$ goes high and when $Q_4$ goes high at time $t_{25}$, flip-flop 1 is set to X high and $\overline{X}$ low. At time $t_{26}$, $P_5$ goes high and the high output at X causes Y to go high and $\overline{Y}$ to go low. In this example it has been shown that if the output of the second stage is in the low level, that the input signal must go positive for a period of time equal to or greater than T, where T includes a sampling pulse followed by a shifting pulse.

The circuit embodying the invention is symmetrical and exhibits digital hysteresis tending to stay in whatever condition it was last put in.

It should be evident from the discussion above that for input signals to pass through the filter they must meet the following requirements: (1) the input signal must be present when the sampling pulse Q is present; and (2) the input pulse must have a pulse width whose duration extends at least from shortly before the falling edge of the Q pulse to shortly after the rising edge of the P pulse. The pulse widths of the P and Q pulse are very narrow. They are made as narrow as possible. The minimum width being governed by the requirement to properly drive their load.

It is evident that the spacing of the P and Q pulses could be varied over a wide range. That is, the pulse P could be generated at any time after the occurrence of the Q pulse. The clock frequency and the sampling rate may go from the sub-microsecond range to increments of time measured in seconds or hours, depending on the application.

DIRECT FEED-THROUGH MODE

It takes a sampling delay for the incoming signal to reach the output (Y, $\overline{Y}$) of the filter for further processing. This delay, depending on the clock frequency, may vary from the microsecond range to the second range. However, there are circumstances when this delay should be eliminated. To this end there is provided, a DIRECT FEED-THROUGH CONTROL, 17, which provides a pulse (S) which when positive provides a direct path between the input and the output of the filter. Its operation is described as follows. When S goes "high" the outputs of gates 26, 27, 32 and 33 are set to the "low" level. S high thus overrides the control of Q, P and Y and $\overline{Y}$. If E is "high" the output of gate 28 is "low" and the output of gate 29 is "high." This causes the set and reset input of flip-flop 1 to go high and low, respectively resulting in X being high and $\overline{X}$ being low. Since the outputs of gates 32 and 33 are low, X being high and $\overline{X}$ being low cause the outputs of NOR gates 34 and 35 to be lo and hi, respectively.

These signals cause the $\overline{Y}$ output of gate 37 to go lo and the Y output of gate 36 to go hi. Thus, with S high the hi input signal is fed directly through to the output of the filter. The only delay being the gate propagation delays which amounts to a few nanoseconds. If E is Lo the outputs of gates 28 and 29 are high and Lo, respectively, causing X to go Lo and $\overline{X}$ to go high. X being low and $\overline{X}$ being high cause the outputs of gates 34 and 35 to go high and low, respectively. This causes flip-flop No. 2 to produce Y "lo" and $\overline{Y}$ "high." Thus, the input signal is transferred to the output with very little delay.

What is claimed is:

1. The combination comprising:
   input means adapted to receive an input signal to be sampled;
   first and second signal storing means;
   first means coupled to said input means and responsive to said input signal for setting said first storing means to a condition indicative of the value of said input signal during a sampling interval;
   second means responsive to the signal stored in said first storing means for shifting the signal stored in said first storing means to said second storing means during a shifting interval succeeding said sampling interval and for then storing said signal in said second storing means; and
   means for coupling to said first means the signal stored in said second storing means for preventing an input signal having a duration shorter than the interval between said sampling and shifting intervals from altering the condition of said first storing means.

2. The combination as claimed in claim 1 further including feed through means coupled to said first and second means for concurrently enabling said first and second means for passing, without delay, said input signal through said first means and through said second means.

3. The combination as claimed in claim 1 wherein said first and second storing means are two state storage means, each having set and reset inputs and two outputs, one output being the complement of the other.

4. The combination as claimed in claim 3 wherein said first means includes means for receiving a sampling pulse during said sampling interval; and wherein said second means includes means for receiving a shift pulse during said shifting interval.

5. The combination as claimed in claim 3, wherein said first gating means includes an inverter for inverting said input signal, and wherein said first means includes one path coupled to said first storing means controlled by said input signal and a second path coupled to said first storing means controlled by the complement of the input signal.

6. The combination comprising:
   an input point for the application thereto of input signals;
   first and second two state storage means each having a set input, a reset input, an output and a complementary output;
   first gating means coupled between said input point and the inputs of said first storage means;
   means for applying sampling pulses to set first gating means for sampling said input signals and setting said first storage means to a binary condition indicative of the binary condition of the input signal;

second gating means coupled between the outputs of said first storage means and the inputs of said second storage means;

means for applying shift pulses to said second gating means for setting said second storage means to the same binary conditions as said first storage means where each shift pulse occurs a time T after the occurrence of a sampling pulse; and means coupling the outputs of said second storage means to said first gating means for controlling the transfer of said input signals to said first storage means and determining the state of said first storage means in the absence of sampling pulses.

7. The combination as claimed in claim 6 wherein said first gating means includes means which in response to an input signal of same binary significance as that present at the outputs of said second storage means apply to the inputs of said first storage means signals of a value to maintain or restore its output to the same binary condition as the output and which in response to an input signal of other binary significance than that present at the outputs of the second storage means maintains the output of said first sorage means in the condition to which it was set when the sampling pulse was present.

8. The combination as claimed in claim 5, further including direct feed through means coupled to said first and second gating means for concurrently enabling both of said gating means for passing, without delay, said input signals through said gating means.

9. The combination as claimed in claim 6 wherein said first gating means includes an inverter for inverting said input signals and wherein said gating means includes one path coupled to one input of said first storage means controlled by the input signal and a second path coupled to the other input of said first storage means controlled by the inverse of said input signal.

10. A circuit for producing output signals of first significance in response to input signals having a first value for a period greater than T and for producing output signals of second significance in response to input signals having a second value for a period greater than T, where said period includes a sampling pulse followed by a shift pulse, comprising:

first and second flip-flops, each flip-flop having a set input and a reset input, an output terminal and a complementary output terminal;

first gating means for periodically sampling said input signals and producing signals in response thereto which are applied to the inputs of said first flip-flop;

second gating means for periodically shifting the signals produced at the outputs of said first flip-flop to the inputs of said second flip-flop, where each shift operation occurs a time T after a sampling operation; and means for comparing the input signal with the output of the second flip-flop for controlling the setting of the first flip-flop; said first flip-flop being reset to its preceeding condition for all input signals whose duration is less than T.

* * * * *

UNITED STATES PATENT OFFICE
CERTIFICATE OF CORRECTION

Patent No. 3,828,258  Dated August 6, 1974

Inventor(s) Vernon Hills and Leesui Wu

It is certified that error appears in the above-identified patent and that said Letters Patent are hereby corrected as shown below:

| | |
|---|---|
| Col. 3, line 18 | "34" should be --- 35 --- |
| Col. 5, line 43 | "Q = S = P" should be -- Q = S = O --- |
| Col. 6, line 36 | After "$P_3$" insert --- goes --- |
| Col. 6, line 43 | "Q = Y = 0 and $\overline{Y}$ = 1" should be --- Q = $\overline{Y}$ = 0 and Y = 1 --- |
| Col. 6, line 63 | "not by b" should be --- not affected by --- |
| Col. 9, line 25 | "sorage" should be --- storage ---. |

Signed and sealed this 31st day of December 1974.

(SEAL)
Attest:

McCOY M. GIBSON JR.
Attesting Officer

C. MARSHALL DANN
Commissioner of Patents